(12) United States Patent
Komma

(10) Patent No.: US 9,412,514 B2
(45) Date of Patent: Aug. 9, 2016

(54) ARRANGEMENT FOR THE INDUCTIVE WIRELESS DELIVERY OF ENERGY

(71) Applicant: Siemens Aktiengesellschaft, München (DE)

(72) Inventor: Thomas Komma, Ottobrunn (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 364 days.

(21) Appl. No.: 13/916,256

(22) Filed: Jun. 12, 2013

(65) Prior Publication Data

US 2013/0334891 A1    Dec. 19, 2013

(30) Foreign Application Priority Data

Jun. 13, 2012   (DE) .......................... 10 2012 209 898

(51) Int. Cl.
*H01F 38/14*     (2006.01)
*H02J 17/00*     (2006.01)

(52) U.S. Cl.
CPC ................ *H01F 38/14* (2013.01); *H02J 17/00* (2013.01)

(58) Field of Classification Search
CPC .... H02J 17/00; B60L 11/182; B60L 11/1827; B60L 11/1829; B60L 11/1831; B60L 11/1833; B60L 11/1835; H01F 38/14
USPC .................................. 307/104; 320/108, 109
See application file for complete search history.

(56) References Cited

U.S. PATENT DOCUMENTS

| | | | | |
|---|---|---|---|---|
| 5,455,467 | A | * | 10/1995 | Young et al. .................. 307/104 |
| 5,654,621 | A | * | 8/1997 | Seelig .................... B60L 11/182 320/108 |
| 6,008,622 | A | * | 12/1999 | Nakawatase ............ H01F 38/14 320/108 |
| 2007/0131505 | A1 | * | 6/2007 | Kim ...................... B60L 11/182 191/14 |
| 2011/0025133 | A1 | * | 2/2011 | Sauerlaender et al. ....... 307/104 |
| 2012/0161530 | A1 | * | 6/2012 | Urano .......................... 307/104 |
| 2012/0248892 | A1 | * | 10/2012 | Covic ...................... H01F 38/14 307/104 |

FOREIGN PATENT DOCUMENTS

| | | |
|---|---|---|
| CN | 101179208 | 5/2008 |
| CN | 102157988 A | 8/2011 |
| CN | 102237724 A | 11/2011 |
| JP | H0194289 A | 4/1989 |
| JP | 2011167036 A | 8/2011 |
| KR | 20120016521 A | 2/2012 |
| WO | WO 2011135424 A2 * | 11/2011 |

OTHER PUBLICATIONS

Chinese Search Report issued on Aug. 4, 2015 with respect to counterpart Chinese patent application 201310231372.0.
Translation of Chinese Search Report issued on Aug. 4, 2015 with respect to counterpart Chinese patent application 201310231372.0.

* cited by examiner

*Primary Examiner* — Fritz M Fleming
(74) *Attorney, Agent, or Firm* — Henry M. Feiereisen LLC.

(57) ABSTRACT

An arrangement for the inductive wireless transmission of energy to a receiver coil of an electrically operated vehicle includes a controllable power supply, an electrically conductive first coil of circular shape, and an electrically conductive second coil of circular shape. The first and second coils are connected to the controllable power supply such that a current direction in the second coil is directed opposite to a current direction in the first coil.

8 Claims, 1 Drawing Sheet

ARRANGEMENT FOR THE INDUCTIVE WIRELESS DELIVERY OF ENERGY

CROSS-REFERENCES TO RELATED APPLICATIONS

This application claims the priority of German Patent Application, Serial No. 10 2012 209 898.4, filed Jun. 13, 2012, pursuant to 35 U.S.C. 119(a)-(d), the content of which is incorporated herein by reference in its entirety as if fully set forth herein.

BACKGROUND OF THE INVENTION

The present invention relates to an arrangement for the inductive wireless delivery of energy.

The following discussion of related art is provided to assist the reader in understanding the advantages of the invention, and is not to be construed as an admission that this related art is prior art to this invention.

Windings of either a circular or solenoid design are used in the wireless charging of electric vehicles. Circular design refers to a coil in which the wires extend spirally in one plane, solenoid design refers to a winding in the manner of a coil. A mixture of both variants is disadvantageous owing to the sub-optimal coupling. The solenoid design is smaller with the same coupling, but causes higher magnetic flux densities, which can lead to impermissible heating of the metallic body in the region of the magnetic field. The circular design has a lower flux density, owing to its larger surface area, but it is less readily able to be mounted on the vehicle.

It would therefore be desirable and advantageous to provide an improved arrangement for the inductive wireless transmission of energy to obviate prior art shortcomings.

SUMMARY OF THE INVENTION

According to one aspect of the present invention, an arrangement for the inductive wireless delivery of energy includes a controllable power supply, an electrically conductive first coil of circular shape, the first coil being connected to the controllable power supply, and an electrically conductive second coil of circular shape, the second coil being connected to the power supply such that a current direction in the second coil is directed opposite to a current direction in the first coil.

Advantageously, the arrangement may be a charging station for electrically operated vehicles embedded into the floor.

The invention has recognized that the magnetically active surfaces can be increased, thereby lowering the flux density, by distributing a floor-mounted circular winding onto two circular windings with different current directions. This results in two magnetic field strength lobes having different directions via which a smaller solenoid winding design—in particular a vehicle-mounted winding—can now also be advantageously operated. A possible heating of metallic foreign bodies that exceeds permissible limits is thereby simultaneously avoided.

The circular winding can be a winding in which the electrical conductor is essentially arranged in one plane. The circular winding can thereby essentially be embodied as ring-shaped. It is, of course, also conceivable to configure the winding substantially rectangular or square in shape. Solenoid design relates to a design in which the winding essentially extends in the form of a helix onto a cylinder barrel.

According to another advantageous feature of the present invention, the first and second coils can be arranged in one plane. In this way, the required installation space is minimized and the design is flat, which accommodates the installation as a floor-mounted charging station for driving electrically operated vehicles for instance. The coils can then be advantageously arranged next to each other.

According to another advantageous feature of the present invention, the first and second coils can be configured of equal size. Since the electrical actuation of the coils must take account of their dimensions and geometry, the similar design of both coils ensures that the controller does not have to be made unnecessarily complex.

According to another advantageous feature of the present invention, the first coil has a center and is defined by a diameter, and the second coil has a center and is defined by a diameter, with the centers of the first and second coils being spaced from one another at a distance which can be at least one and a half times their diameters. The distance can advantageously be adjusted to the coil size of the vehicle-mounted coils.

According to another advantageous feature of the present invention, an iron core element can be sized to extend from a central region of the first coil to a central region of the second coil. Advantageously, the iron core element is a ferrite element.

According to another advantageous feature of the present invention, the power supply can have a communication device for communication with an electrically operated vehicle, with the power supply configured to receive control data for an electric charge from the vehicle and to direct supplied current into the first and second coils.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
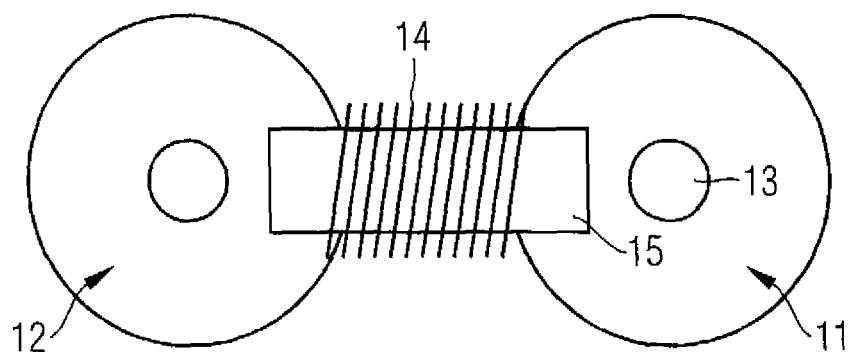
FIG. 1 shows a schematic top view of a floor-mounted coil arrangement and a vehicle-mounted coil arrangement.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 2:
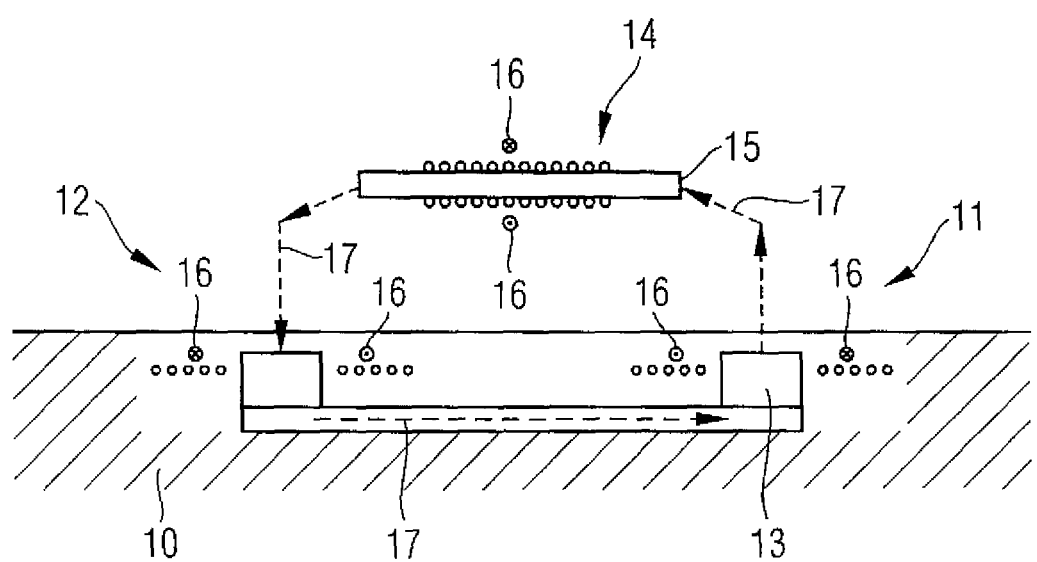
FIG. 2 a side view of the floor-mounted coil arrangement and a vehicle-side coil arrangement.

Turning now to the drawing, and in particular to FIG. 1, there is shown a schematic top view of a floor-mounted coil arrangement for electric vehicles together with a vehicle-mounted solenoid coil 14, which is used to receive the supplied energy. The vehicle-mounted coil 14 is fixed to a vehicle (not shown in more detail), while the floor-mounted charging station is embedded into the floor 10. FIG. 1 shows a view from above onto the named components, while FIG. 2 shows a side view of the components.

The floor-mounted charging station comprises a first circular winding 11 as well as a second circular winding 12 arranged in a coplanar manner. Both windings 11, 12 are of equal size and in principle designed similarly. The centers of the two windings 11, 12 lie somewhat further apart from one another than the length of the ferrite core 15. The circular windings in this example are embodied as ring-shaped. In an alternative embodiment the circular windings are embodied as square, i.e. the electric conductors extend in a linear direction away from the corners of the winding.

A ferrite element 13 connects the central region of the two windings 11, 12. In addition the ferrite element 13 comprises cylinder-shaped pieces which are arranged in the center of the two windings 11, 12, and a connecter, which is permanently mechanically coupled with the two cylinder-shaped pieces and extends underneath the windings 11, 12, in the floor 10.

Both windings 11, 12, are connected to a controllable power supply not shown in the figures. The controllable power supply provides for the actuation of the windings 11, 12, so that an inductive energy transmission is made possible at a suitable frequency and therefore power. In addition a controlled alternating field is applied to the windings 11, 12, should a charge be desired. For this purpose, the charging station preferably also comprises a communication device which allows parameters for the charging process such as the maximum charging power, inter alia, to be exchanged with the electric vehicle. The controllable power supply in this case is connected to the windings 11, 12, in such a way that a counter-current direction always dominates in the windings 11, 12. In this case it is expedient that the current parameters in both windings 11, 12, are otherwise the same, i.e. the intensity of the current is always the same, only the direction is reversed. This situation is illustrated further by the current direction arrows 16 in the region of the two windings 11, 12.

Normally a simultaneous use of circular and solenoid windings for charging electric vehicles is disadvantageous because of the sub-optimal magnetic coupling. Due to the arrangement and the operation of the windings 11, 12, as illustrated in the present example, a scaled down solenoid winding 14 can however now be used in the electric vehicle with a suitable ferrite core 15. Said winding is ideally arranged over the magnetic field strength lobes. The simplified course of the magnetic flux 17 is illustrated in FIG. 2 for the purposes of clarification. The solenoid winding 14 is advantageously simpler to install in the electric vehicle than a comparable circular winding.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. An arrangement for the inductive wireless delivery of energy, comprising:
    a controllable power supply;
    a floor-mounted winding assembly including an electrically conductive first coil of circular shape, said first coil being connected to the controllable power supply, an electrically conductive second coil of circular shape, said second coil being connected to the power supply such that a current direction in the second coil is directed opposite to a current direction in the first coil, and a core element connecting central regions of the first and second coils; and
    a vehicle-mounted cylindrical winding operated by the floor-mounted winding assembly.

2. The arrangement of claim 1, constructed for the inductive wireless delivery of energy to a receiver coil of an electrically operated vehicle.

3. The arrangement of claim 1, wherein the first and second coils are arranged in a coplanar manner.

4. The arrangement of claim 1, wherein the first and second coils are of equal size.

5. The arrangement of claim 1, wherein the first coil has a center and is defined by a diameter, and the second coil has a center and is defined by a diameter, the centers of the first and second coils being spaced from one another at a distance which is at least one and a half times their diameter.

6. The arrangement of claim 1, wherein the core element is an iron core element sized to extend from the central region of the first coil to the central region of the second coil.

7. The arrangement of claim 6, wherein the iron core element is a ferrite element.

8. The arrangement of claim 1, wherein the power supply has a communication device for communication with an electrically operated vehicle, said power supply configured to receive control data for an electric charge from the vehicle and to direct supplied current into the first and second coils.

* * * * *